(12) United States Patent
Schumacher

(10) Patent No.: US 12,018,950 B2
(45) Date of Patent: Jun. 25, 2024

(54) CHARGING SYSTEM FOR DYNAMIC CHARGING OF ELECTRIC VEHICLES

(71) Applicant: TOP KA-PROJEKT GMBH, Stuttgart (DE)

(72) Inventor: Uli Erich Schumacher, Stuttgart (DE)

(73) Assignee: TOP KA-PROJEKT GMBH, Stuttgart (DE)

(*) Notice: Subject to any disclaimer, the term of this patent is extended or adjusted under 35 U.S.C. 154(b) by 679 days.

(21) Appl. No.: 17/253,164

(22) PCT Filed: Jun. 17, 2019

(86) PCT No.: PCT/EP2019/065908
§ 371 (c)(1),
(2) Date: Jun. 30, 2021

(87) PCT Pub. No.: WO2019/243269
PCT Pub. Date: Dec. 26, 2019

(65) Prior Publication Data
US 2021/0404820 A1   Dec. 30, 2021

(30) Foreign Application Priority Data

Jun. 18, 2018   (DE) .................... 10 2018 114 593.4

(51) Int. Cl.
*G01C 21/34* (2006.01)
*B60L 53/66* (2019.01)
(Continued)

(52) U.S. Cl.
CPC .......... *G01C 21/3438* (2013.01); *B60L 53/66* (2019.02); *B60L 53/67* (2019.02);
(Continued)

(58) Field of Classification Search
CPC . G01C 21/3438; G01C 21/3469; B60L 53/66; B60L 53/67; B60L 53/68;
(Continued)

(56) References Cited

U.S. PATENT DOCUMENTS 11,161,427 B2 * 11/2021 Amano ................. B60L 53/305
2005/0085226 A1 * 4/2005 Zalewski ............... G06Q 20/06
455/426.1

(Continued)

FOREIGN PATENT DOCUMENTS

DE    112016006821 T5    2/2019
EP        3056862 A       8/2016
(Continued)

OTHER PUBLICATIONS

International Search Report; PCT/EP2019/065908; dated Aug. 29, 2019.
(Continued)

*Primary Examiner* — Richard M Camby
(74) *Attorney, Agent, or Firm* — Jones Day

(57) ABSTRACT

The invention relates to a charging system for dynamic charging of electric vehicles, comprising at least one navigation function on at least one mobile device or connectable to a navigation device, and/or software application installed and executed on at least one server, and a plurality of mobile charging vehicles each having a navigation apparatus configured to, inter alia, transmit a current position of each mobile charging vehicle of the charging system to the software application, wherein the software application is configured to display at least the respective next mobile charging vehicle on the mobile device located in an electric vehicle and, in the case that an electric battery of the electric vehicle is to be charged, to transmit a charging request for this electric vehicle and at least one current position of the
(Continued)

electric vehicle to the displayed mobile charging vehicle, wherein the navigation apparatus of the charging vehicle is configured for transmitting coordinates of a suitable common meeting point (TP) and a suitable meeting time (TZ) for charging the battery of the electric vehicle to the mobile device in the electric vehicle to be charged on the basis of the received charging request, wherein the software application is configured to convert the meeting point (TP) and meeting time (TZ) into navigation instructions for a driver of the electric vehicle to be charged.

18 Claims, 4 Drawing Sheets

(51) Int. Cl.
    *B60L 53/67*     (2019.01)
    *B60L 53/68*     (2019.01)
    *B60L 58/12*     (2019.01)

(52) U.S. Cl.
    CPC .......... *B60L 53/68* (2019.02); *G01C 21/3469* (2013.01); *B60L 58/12* (2019.02); *B60L 2240/622* (2013.01)

(58) Field of Classification Search
    CPC .... B60L 58/12; B60L 2240/622; B60L 53/65; B60L 58/14; B60L 53/63; Y02E 60/00; Y02T 10/70; Y02T 10/7072; Y02T 90/16; Y02T 90/167; Y04S 10/126; Y04S 30/14; G06Q 10/02; G06Q 10/047

See application file for complete search history.

(56) References Cited

U.S. PATENT DOCUMENTS

| | | | |
|---|---|---|---|
| 2010/0256846 A1* | 10/2010 | Shaffer | G06Q 10/06 701/22 |
| 2010/0257195 A1* | 10/2010 | Inoue | G06F 16/9535 707/769 |
| 2011/0202221 A1* | 8/2011 | Sobue | B60L 8/003 701/22 |
| 2012/0203409 A1 | 8/2012 | Sekijima et al. | |
| 2015/0298565 A1 | 10/2015 | Iwamura et al. | |
| 2019/0152340 A1* | 5/2019 | Haneda | B60L 53/64 |

FOREIGN PATENT DOCUMENTS

| | | |
|---|---|---|
| WO | 2013039753 A1 | 3/2013 |
| WO | 2017209736 A1 | 12/2017 |
| WO | 2018021573 A1 | 2/2018 |

OTHER PUBLICATIONS

German Office Action, Appl. 10 2018 114593.4, dated Apr. 10, 2019.

\* cited by examiner

CHARGING SYSTEM FOR DYNAMIC CHARGING OF ELECTRIC VEHICLES

CROSS-REFERENCE TO RELATED APPLICATIONS

This application is a national stage entry of PCT/EP2019/065908, filed on Jun. 17, 2019, which claims priority to German Provisional Application No. 102018114593.4, filed Jun. 18, 2018. The contents of which are incorporated herein by reference in their entireties.

FIELD OF THE INVENTION

The invention relates to a charging system for dynamic charging of electric vehicles with a corresponding software application and a corresponding method, as well as a data storage product with a software application stored thereon.

BACKGROUND OF THE INVENTION

To cover the power requirements of electric vehicles, charging stations are used to provide the electrical power required for this purpose. With the increasing number of electric vehicles and the desire for improved mobility, especially for long-distance travel, the problem arises that different users with different charging requirements have to visit charging stations that may be located far away from their planned driving route and whose charging capacity or availability of charging stations is exhausted due to a time-related large rush of customers and thus further detours have to be accepted without allowing the electric battery of the electric vehicle to be exhausted.

Document US 2015/0298565 A1 discloses a charge support system and method for supporting the loading of an electric vehicle, which is intended to prevent electric vehicles from draining the battery and stopping before reaching their destination. To this end, a control center monitors the state of charge of a large number of electric vehicles and, if the state of charge is low, transmits to them a request to drive to a stationary electric charging station located at a certain point and guides the electric vehicles to a suitable electric charging station, wherein the conditions of the electric charging station (amount of energy available there, expected customer rush, etc.) are taken into account when selecting the electric charging station.

This may prevent electric vehicles from breaking down during a cross-country trip due to an empty battery. However, it would be desirable to have a charging system for charging an electric battery that takes into account the individual needs of the electric vehicle driver along his route and charges the vehicles as effectively as possible.

SUMMARY OF THE INVENTION

It is therefore an object of the invention to provide a charging system for charging an electric battery that is configured to take into account the individual needs of the driver of the electric vehicle along his route and to enable effective charging of the electric vehicle.

This object is solved by a charging system for dynamic charging of electric vehicles comprising at least one navigation function on at least one mobile device or connectable to a navigation device, and/or software application installed and executed on at least one server, and a plurality of mobile charging vehicles each having a navigation apparatus configured to, inter alia, transmit a current position of each mobile charging vehicle of the charging system to the software application, wherein the software application is configured to display at least the respective next mobile charging vehicle on the mobile device located in an electric vehicle and, in the case that an electric battery of the electric vehicle is to be charged, to transmit a charging request for this electric vehicle and at least one current position of the electric vehicle to the displayed mobile charging vehicle, wherein the navigation apparatus of the charging vehicle is configured for transmitting coordinates of a suitable common meeting point and a suitable meeting time for charging the battery of the electric vehicle to the mobile device in the electric vehicle to be charged on the basis of the received charging request, wherein the software application is configured to convert the meeting point and meeting time into navigation instructions for a driver of the electric vehicle to be charged.

Due to the position of both vehicles (mobile charging vehicle and electric vehicle to be charged) and the defined common meeting point, dynamic charging is made possible in which both vehicles move from their respective starting positions towards the meeting point and thus dynamically approach an effective meeting point. This saves time and resources for the electric vehicle to be charged or its driver in comparison to a stationary charging station (charging station). At least the next charging vehicle can be displayed on a map displayed on a screen, for example of the mobile device, by means of a corresponding symbol or marker, or by indicating coordinates or addresses to be approached accordingly. The transmission of the common meeting point can be the implicit order confirmation for charging the electric vehicle according to the transmitted charging request. However, an explicit order confirmation can also be sent from the charging vehicle to the software application on the mobile device.

The term "electric vehicle" refers to all vehicles with an electric motor including hybrid vehicles with additional other types of motors. The term "charging vehicle" refers to vehicles that comprise an energy reservoir for conversion into electrical energy and can thus provide this electrical energy for charging a vehicle battery for operation of an electric vehicle at any location. For example, such charging vehicles can be trucks with appropriate equipment. These charging vehicles can themselves be powered by an electric motor, but can also comprise other types of engines such as internal combustion engines, hybrid engines or other engines for personal transport. The navigation apparatus of the mobile charging vehicle determines both the current position of the charging vehicle and calculates the common meeting point. The navigation apparatus can, for example, be a navigation system that has been extended in its functionality. The meeting time can be influenced by possibly still running power refueling of other electric vehicles at a preceding agreed meeting point with another electric vehicle, because in such cases the charging vehicle cannot start immediately to the new common meeting point. Provided that the transmitting of the charging request is done in time, this does not hinder the common meeting point, but at best it influences the position of the common meeting point, so that it may move further along the planned driving route of the electric vehicle to be charged towards the electric vehicle's destination.

In this context, the term "software application" refers to application software (also called application program, or application or application (APP) for short), which describes computer programs that are used to process or support a useful or desired non-system functionality. Mobile APPs (on mobile devices) can, for example, be obtained via an APP Store integrated into the mobile operating system and installed directly on the device. Mobile Web APPs can be accessed via the web browser of the mobile device. Installation refers to the installation of the software application on the mobile device itself or an interface for using a corresponding application program via a web page. Execution of the software application is defined as the execution via a processor of the mobile device or the processing of data provided to the mobile device via the interface via a Web-APP.

In this context, the term "mobile device" means a device that is configured to establish a radio or Internet connection with other devices and has a display screen. Such mobile devices are for example smartphones, tablet PCs, laptops, digital communication devices or navigation devices on which software applications can be installed and executed. In particular, it may be an iOS or Android smartphone, a device installed in the vehicle, such as an Android device and/or a media system of the vehicle. The navigation function of the mobile device enables the navigation instructions generated by the software application to reach the appropriate common meeting point to be converted into a navigation route to the meeting point, which the driver can use to drive to the common meeting point with the charging vehicle. Alternatively, the mobile device can be connected to a navigation device, wherein the navigation instructions of the software application are processed into a corresponding navigation route by the navigation device in electric vehicle using appropriate interfaces. If the mobile device is on board an electric vehicle, the position of the mobile device is identical to the position of the electric vehicle. This means that either the current position of the mobile device or the current position of the electric vehicle from a navigation device in electric vehicle can be transmitted to the charging vehicle via the mobile device as position information of the electric vehicle.

Thus, the dynamic charging system according to the invention enables an effective charging of the electric vehicle and takes into account the individual needs of the customer of the electric vehicle. In contrast to the state of the art, the charging process is not viewed exclusively from the perspective of the locally fixed charging station, but combines the conditions of the mobile charging station with the position and movement data of the electric vehicle and, if necessary, its movement data to create a more effective charging process for the electric vehicle compared to the state of the art.

In one embodiment the software application only generates the navigation instructions from the common meeting point and meeting time for the electric vehicle, after a confirmation of the charging request at the common meeting point was transmitted to the charging vehicle via the software application. This allows the driver of the electric vehicle to first check whether the common meeting point and meeting time are acceptable for him and the charge level of his electric vehicle. If not, the electric vehicle can, if necessary, continue its route and, after displaying another mobile charging vehicle at a later time, take advantage of the charging by the charging vehicle offered. This gives the charging system a flexibility for the driver of the electric vehicle that can take even greater account of his customer's wishes.

Further an exchange of data between the server and the mobile device and/or a data storage and/or an exchange of data within the software application at least partially using distributed ledger technology (DLT), in particular a block chain system, is carried out. This increases security due to better protection against data loss and/or additional encryption of the data.

In another embodiment the common meeting point and the meeting time are determined by the navigation apparatus of the mobile charging vehicle taking into account at least one previous route of the electric vehicle to be charged, wherein the software application transmits the previous route to the mobile charging vehicle with the charging request on the basis of correspondingly recorded position data. By taking the previous route into account, the driving behavior of the electric vehicle, such as current speed, previous average speed and future direction of movement can be used as a basis for the calculation of an appropriate common meeting point, whereby the route of the electric vehicle for the desired charging is disturbed even less than if only the current position of the electric vehicle at the time of transmission of the charging request is used as a basis. The previous route can be taken by the software application from a navigation device connected to the mobile device or it can be recorded by the software application based on an existing navigation function in the mobile device itself, for example based on the time sequence of the GPS data determined by the mobile device itself using a GPS module.

In another embodiment the software application transmits to the charging vehicle, in addition to the previous route, also the route planned for the electric vehicle up to a route destination, and the navigation apparatus of the charging vehicle takes into account the planned route to calculate the common meeting point and the meeting time. Taking into account the further planned route, the common meeting point and the corresponding meeting time can be adjusted even better to the needs of the driver of the electric vehicle, so that the route of the electric vehicle for the desired charging is even less disturbed. The planned route in electric vehicle can also be taken by the software application from a navigation device in electric vehicle connected to the mobile device, or provided by the software application on the basis of an existing navigation function in the mobile device itself.

In another embodiment the navigation apparatus of the charging vehicle automatically calculates the fastest route for the charging vehicle to the meeting point and displays it in the charging vehicle as a driving route. In this way the charging vehicle reaches the common meeting point the fastest, which extends the spatial range of possible appropriate common meeting points, taking into account the customer's wishes and the least possible disturbance of the electric vehicle's route.

In another embodiment the navigation apparatus of the charging vehicle transmits the current position of the charging vehicle at least periodically to the software application for a retrieval in the electric vehicle on a path to the common meeting point. Thus it can be constantly checked up to the meeting time whether the common meeting point can be reached by the charging vehicle as planned at the meeting time. If necessary, the electric vehicle could cancel the common meeting point in case of an unplanned delay and arrange another meeting point, if necessary with another mobile charging vehicle.

In another embodiment the software application is configured to display the current position of the charging vehicle on the way to the common meeting point on a navigation display in the electric vehicle. Via such a display, the driver of the electric vehicle is provided with a simple visual and thus immediate control whether the agreements on meeting point and meeting time can be adhered to.

In another embodiment the software application is configured to display all positions of all charging vehicles in order to enable a selection of a desired charging vehicle for charging the electric vehicle. Also, in an embodiment, the driver of the charging vehicle can also suggest a common meeting point alternatively or together with the previous embodiments and is therefore not dependent on the meeting point calculated and transmitted by the charging vehicle. This enables the driver of the electric vehicle to plan his refueling stops highly efficiently in advance of his journey along a driving route. For example, he can also arrange a meeting point at a rest stop with the charging vehicle at lunchtime or have the electric vehicle recharged on the premises of his business partner during an appointment (e.g. a customer visit), for which the software application provides the necessary options.

In another embodiment the charging vehicle has an energy storage or battery storage of more than 300 kWh and at least one DC charging unit and at least one AC charging unit. All established electric vehicles can be charged with it. The charging vehicle can also comprise more DC or AC charging stations, for example two DC charging units and two AC charging units. This means that a common meeting point can be arranged for the more than one electric vehicle, as long as the routes of the respective electric vehicles make this appear reasonable and as little disruption to the routes of the respective electric vehicles.

The charging of the electric vehicle can be invoiced on the basis of the travel time to the meeting point and the charging time on a time basis or on the basis of the travel time to the meeting point and the amount of charged energy.

Furthermore, the invention relates to a method for dynamic charging of electric charging vehicles in a charging system according to the invention comprising a software application installed and executed at least on at least one mobile device which comprises a navigation function or respectively connectable to a navigation device, and a plurality of mobile charging vehicles each having a navigation apparatus, comprising the following steps that can be realized:

transmitting current positions of each mobile charging vehicle of the charging system to the software application by the navigation apparatus of the charging vehicle;
displaying at least the respective next mobile charging vehicle on the mobile device located in an electric vehicle by the software application;
transmitting by the software application a charging request for the electric vehicle and at least one current position of the electric vehicle to the displayed mobile charging vehicle in the case of an electric vehicle having an electric battery to be charged;
transmitting coordinates of a suitable common meeting point and a suitable meeting time for charging the battery of the electric vehicle based on the received charging request to the mobile device in the electric vehicle to be charged by the navigation apparatus of the charging vehicle; and
Conversion by the software application of meeting point and meeting time into navigation instructions for a driver of the electric vehicle to be charged by the software application for navigation of the electric vehicle to the common meeting point.

This method according to the invention thus enables an effective charging of the electric vehicle, taking into account the individual needs of the customer of the electric vehicle and, in contrast to the state of the art, does not consider the charging process exclusively from the point of view of the locally fixed electric charging station, but combines the conditions of the mobile charging station with the position and charging situation of the electric vehicle and, if necessary, its movement data to create a much more effective charging process for the electric vehicle compared to the state of the art.

In a further embodiment of the method, the method comprises the additional step of determining the common meeting point and the meeting time taking into account at least one previous route of the electric vehicle to be charged from the navigation apparatus of the mobile charging vehicle, wherein the software application has transmitted the previous route to the mobile charging vehicle together with the charging request on the basis of correspondingly recorded position data.

In a further embodiment of the method the software application transmits, in addition to the previous route, also the route planned for the electric vehicle up to a route destination to the charging vehicle and the navigation apparatus of the charging vehicle takes into account the planned route for calculating the common meeting point and the meeting time.

In a further embodiment of the method, the method comprises the additional step of at least periodically transmitting the current position of the charging vehicle on a path to the common meeting point by the navigation apparatus to the software application for a retrieval in the electric vehicle.

In a further embodiment of the method, the method comprises the additional step displaying the current position of the charging vehicle on its way to the common meeting point by the software application on a navigation display in the electric vehicle.

In a further embodiment of the method, the software application displays all positions of all charging vehicles to enable selection of a desired charging vehicle for charging the electric vehicle, followed by selecting one of the displayed charging vehicles as the charging vehicle for charging the battery of the electric vehicle.

In a further embodiment of the method, the software application suggests a meeting point and/or a common meeting time to the charging vehicle, which is adopted by the charging vehicle as common meeting point and common meeting time. The suggested meeting point and/or meeting time can be entered into the mobile device by an operator of the mobile device, for example the driver of the electric vehicle, for which purpose the software application provides a corresponding input mask. The desired meeting point can be entered, for example, by entering the location coordinates or by marking a corresponding point on an input mask designed as a map.

Furthermore, a data storage product can be realized with a software application stored on the data storage product appropriate for the execution of the software application related steps of the method for dynamic charging.

Data storage products can be any memory suitable for storing software programs such as software applications, such as data sticks, CDs, hard drives, servers and other devices suitable for this purpose.

The embodiments of dynamic charging listed above can be used individually or in any combination with each other to design the dynamic charging device according to the invention and the dynamic charging method according to the invention.

It is obvious that the digital access system can support dynamic charging by allowing the charging vehicle, especially an occupant, such as a driver, service person or other employee, access to the electric vehicle for charging the energy storage or accumulator. For example, a tailboard can be released for charging the electric vehicle. For this purpose, data for activating the unlocking unit are transmitted to the charging vehicle or the occupant by the activation unit for at least a period of time.

The activation of the unlocking unit can be carried out in particular as follows.

Essential components are the software application that interacts with the vehicle to be charged. In particular, the software application is a server-supported application which evaluates incoming information from the vehicles to be charged and/or the charging vehicles, controlling the charging vehicles, determining meeting points and/or regulating the billing.

The interaction with the vehicle to be loaded can be achieved by partially installing the software application on a mobile device and/or by installing and executing a mobile application connected to the software application on a mobile device, wherein access to necessary vehicle data is provided in particular via an OBD2 interface of the vehicle.

Preferably, the communication between the parts of the software application installed on the server and the mobile device, in particular the forwarding and storage of the data required in particular for controlling the access to the vehicle to be loaded, the loading of the vehicle to be loaded and the settlement of the loading, is carried out using DLT, in particular via a block chain application. This creates a multiple redundant security for all regulation, contract and billing processes, which is, however, transparent for all partners in the defined area.

For example, the mobile device or mobile application receives all essential information from the vehicle to be charged via the OBD2 interface, such as driving style, charging capacity and state of charge of the battery, temperature and position.

Furthermore, the part of the software application or the mobile application executed on the mobile device knows the destination, if necessary the parking place of the vehicle to be charged, has access to navigation data and traffic situation and is connected to the internet.

The software application calculates when the vehicle to be loaded has to meet a charging vehicle where and how much electrical energy is required.

The DLT, in particular block chain technology, is used to transmit the corresponding data to the server or to store this data. The server, by means of which the vehicles to be loaded and the charging vehicles are monitored, confirms via the DLT or block chain to the part of the software application or the mobile application executed on the mobile device the meeting of the vehicle to be loaded and the planned meeting point. However, these are not static, but can be adapted based on changes recorded by the software application and/or the mobile application.

The software application also receives data that allows the access system to allow the charging vehicle to access the vehicle to be loaded for the loading. This can be done independently of the use of DLT or block chain technology. Preferably, the data has a limited validity period, which is adapted to the planned time of the meeting between charging vehicle and vehicle to be loaded. Preferably, the data only allow access a certain time before or after a calculated time of the meeting. The data may comprise, for example, a code that can only be used once. After the one-time use or the expiration of the validity period, the code can no longer be used to access the vehicle to be loaded. The data required for access is generated or transmitted in particular as follows.

Personal data of the persons involved, such as movement profiles, remain as highly sensitive data within the part of the software application or mobile application executed on the mobile device in the vehicle to be loaded. The mobile device reports only an ID of the customer and time and place of the planned meeting point to the server. The transmission of the data is encrypted, especially via the DLT or block chain.

For each loading process a new DLT or block chain process is generated. Also new orders of the same customer or repeat orders lead to a new DLT or block chain process. This prevents individual order data, access codes or other data related to the loading process from being reused after the loading process has been completed and the block chain closed. Due to the encryption by the DLT or block chain, it is not possible to retrieve this data in such a way that it can be misused, as the data is useless for other loading or payment processes. Each load order is unique and cannot be changed due to the DLT or Blockchain technology.

With a single block chain process an individual order number is linked, with which only a single loading process or loading order can be triggered.

In particular, the server can be designed as a high-performance clustered server or be designed as a cloud application. The server controls all charging vehicles and negotiates with the vehicle to be loaded possible meeting points within the transmitting parameters. For this purpose, the software application uses a block chain to determine all data necessary for processing the loading process, compares it with the real conditions and possibilities and offers the user of the vehicle to be loaded an order confirmation. If the order confirmation is accepted, the data necessary for the loading process, in particular code for the access system, meeting point, meeting time are transmitted to the vehicle to be loaded, the charging vehicle, in particular the operator of the vehicle to be loaded or the operator of the charging vehicle.

Furthermore, the software application arranges and monitors the loading process, wherein this process, in particular due to the use of the block chain technology, after the acceptance of the order confirmation, has an automatic sequence in which it is basically not possible to intervene. If a charging vehicle breaks down, a new block chain process is generated and then carried out with an alternative charging vehicle.

The use of the DLT or block chain offers the advantage that it can be built on existing block chain applications and thus, in addition to the logistical handling of the loading process, payment and accounting processes or their formalities can be handled.

The server or software application can manage all contracts with the operators of the vehicles or charging vehicles to be loaded, as well as settle and controlling all transactions.

Furthermore, the server offers an interface to partners such as electricity providers, other charging vehicle providers or the fleet management of companies and organizations via the DLT or block chain.

The DLT or block chain can be implemented as an ERC20/ERC223 solution and can run on an existing block chain application.

The advantage of the DLT or block chain technology used in the charging system is that it performs the task of a decentralized, multiple redundant database and offers the possibility to carry out and automate the contract management via smart contracts (electronic automatic contracts) with high security.

It is thus possible to provide an encrypted connection for the exchange of the necessary data between all parties, wherein Smart Contracts are the preferred means of regulating who has access to which data and who can view which information and how.

The billing can preferably be done via own tokens, which are preferably also connected via Smart Contracts with classical payment providers, such as credit card providers, parties involved in SEPA payment transactions and/or providers such as PayPal.

The use of DLT or block chain technology enables cost optimization due to the reduced hardware and software structure required for loading, as well as the high degree of automation and the resulting reduction of manual intervention, without reducing security. Furthermore, the use of this technology improves safe and clearly regulated communication possibilities between an unlimited number of partners. The server or cloud resources as well as the software application or the mobile application do not have to open vulnerable interfaces.

Furthermore, the description comprises the following figures, by means of which further aspects of the dynamic charging system described above are explained. These and other aspects of the invention are shown in detail in the figures below.

BRIEF DESCRIPTION OF THE FIGURES

These and other aspects of the invention are shown in detail in the figures below.

DETAILED DESCRIPTION OF THE EMBODIMENTS

Figure 1:
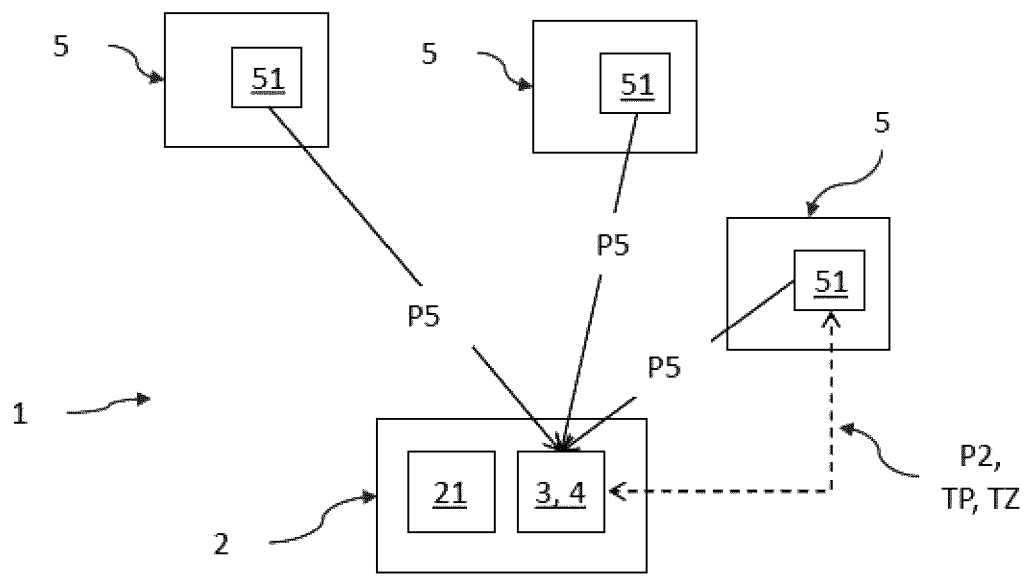
FIG. 1: Schematic representation of an embodiment of the charging system according to the invention

FIG. 1 shows a schematic representation of an embodiment of the charging system 1 according to the invention for dynamic charging of electric vehicles 2 comprising one or more mobile devices 3 (for reasons of clarity, only one mobile device in an electric vehicle 2 is shown here as an example) which each comprise a navigation function or can be connected to a navigation device 22 in the respective electric vehicle 2 and a software application 4 installed and executed on the respective mobile device 3 as well as a plurality of mobile charging vehicles 5 each with a navigation apparatus 51 which is configured, inter alia, to transmit a current position P5 of each mobile charging vehicle 5 of charging system 1 to software application 4. The software application 4 is configured to display at least the next mobile charging vehicle 5 on the mobile device 3 located in an electric vehicle 2 and, in case of an electric battery 21 of the electric vehicle 2 to be charged, to transmit a charging request for this electric vehicle 2 as well as at least one current position P2 of the electric vehicle 2 to the displayed mobile charging vehicle 5, whereby the current position of the mobile device is equated with the current position P2 of the electric vehicle 2 since the mobile device 3 is located on board the electric vehicle 2. The navigation apparatus 51 of the charging vehicle 5 is in turn configured to transmit coordinates of a suitable common meeting point TP and a suitable meeting time TZ for charging the battery 21 of the electric vehicle 2 to the mobile device 3 in the electric vehicle 2 to be charged on the basis of the received charging request, whereby the software application 4 is configured to convert meeting point TP and meeting time TZ into navigation instructions for a driver of the electric vehicle 2 to be charged. The software application 4 can only generate the navigation instructions from the common meeting point TP and meeting time TZ for the electric vehicle 2 after transmitting a confirmation of the charging request at the common meeting point TP to the charging vehicle 5 via the software application 4. In an embodiment, the software application 4 can also be configured to display all positions P5 of all charging vehicles 5 to enable the selection of a desired charging vehicle 5 for charging the electric vehicle 2 by an operator of the mobile device (e.g. the driver of electric vehicle 2).

Figure 2:
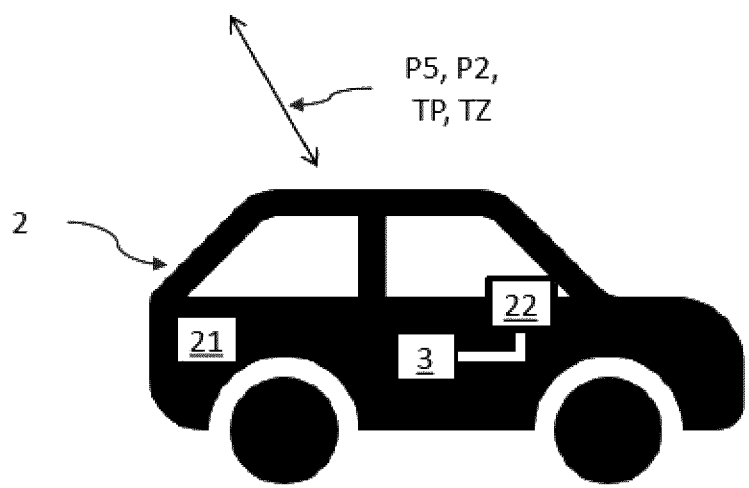
FIG. 2: Schematic representation of an embodiment of the electric vehicle with mobile device and software application for the dynamic charging system installed on it according to the invention.

FIG. 2 shows a schematic representation of an embodiment of the electric vehicle 2 with an electric battery 21 for the operation of the electric vehicle 2 and with a mobile device 3 and inventive software application 4 installed on it. Here, the software application 4 can be configured to convert meeting point TP and meeting time TZ into navigation instructions for a driver of the electric vehicle 2 to be charged, wherein the software application 4 can display the current position P5 of the charging vehicle 5 on the way to the common meeting point TP on a navigation display in the electric vehicle 2. The navigation display can be the screen of the mobile device 3 or the screen of the navigation device 22 connected to the mobile device 3 in electric vehicle 2. For this purpose, the mobile device 3 can be connected to the navigation device 22 via a cable or an interface for wireless near field communication (e.g. Bluetooth). The software application 4 provides appropriate interfaces for data transfer to the navigation device 22. In one embodiment, the navigation apparatus 51 of the charging vehicle 5 can transmit the current position P5 of the charging vehicle 5 at least periodically to software application 4 for retrieval in the electric vehicle 2 on its way to the common meeting point TP until the charging vehicle 5 has reached the common meeting point TP.

Figure 3:
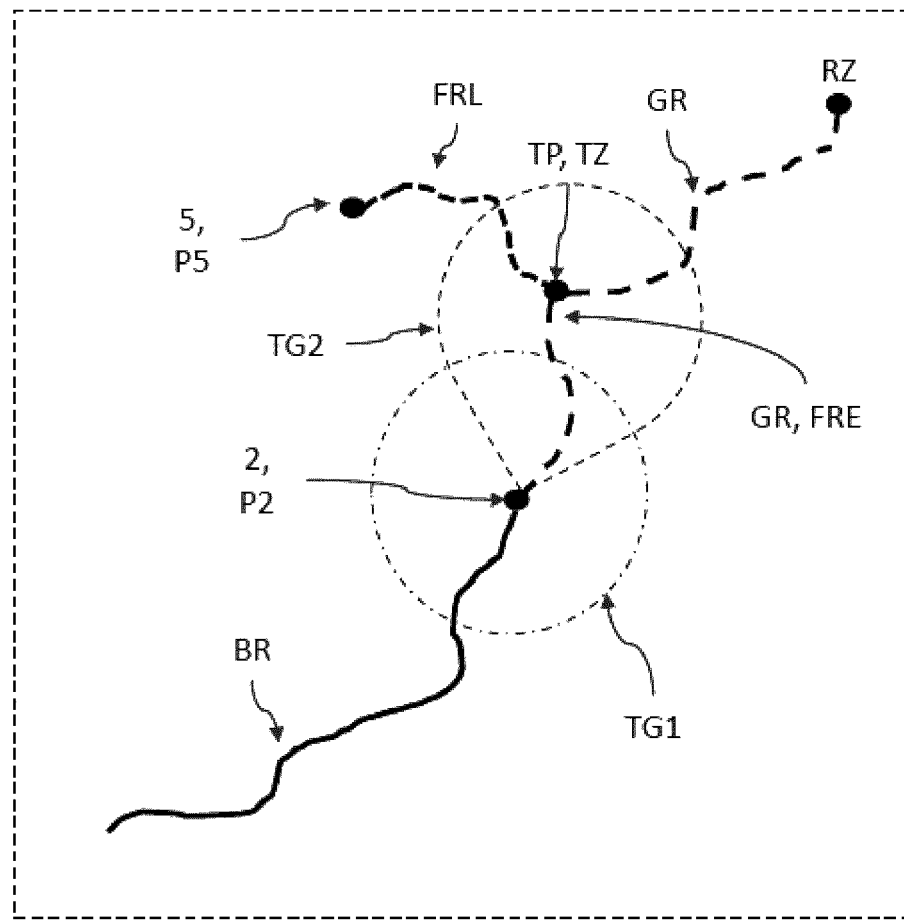
FIG. 3: Schematic representation of the calculation of the common meeting point based on position and movement data of the electric vehicle.
Figure 6:
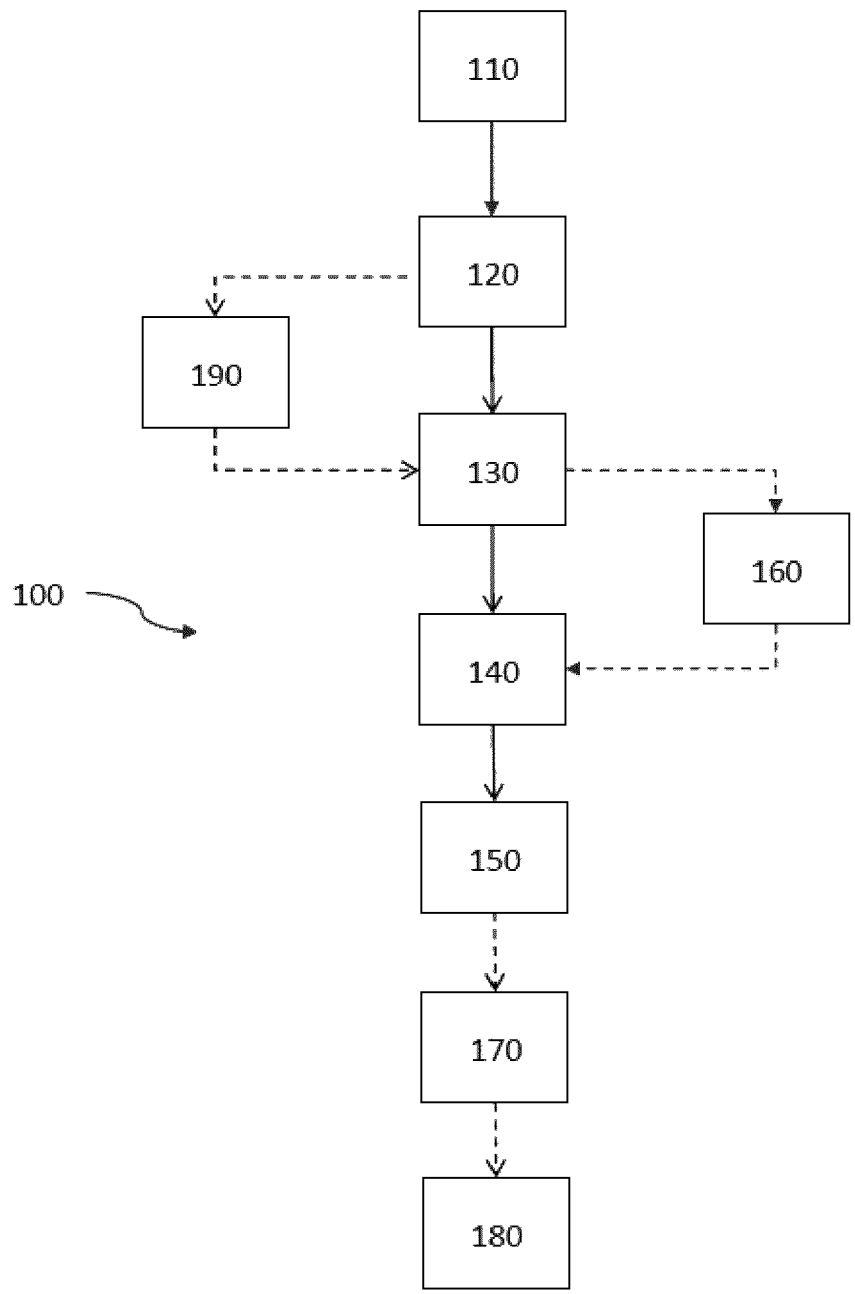
FIG. 6: Schematic representation of an embodiment of the method for the dynamic charging.

FIG. 3 shows a schematic representation of the calculation of the common meeting point TP based on position and movement data of the electric vehicle 2 as well as the routes FRE, FRL of the charging vehicle 5 and the electric vehicle 2 to the common meeting point TP. Provided that together with the charging request only the current position P2 of the electric vehicle 2 is transmitted to the displayed mobile charging vehicle 5, the navigation apparatus 51 of the charging vehicle 5 can, without knowledge of the previous route BR and the planned future route GR of the electric vehicle 2, use only a meeting point area TG1 (circle represented by a dash point line) around the current position P2 of the electric vehicle 2 to calculate an appropriate common meeting point TP, the diameter of which is determined, for example, by the road conditions and assumed speeds of the two vehicles 2, 5. If, on the other hand, the common meeting point TP and the meeting time TZ are determined by the navigation apparatus 51 of the mobile charging vehicle 5 taking into account a previous route BR of the electric vehicle to be charged 2, another meeting point area TG2 can be assumed on the basis of the assumption that the previous route will continue approximately in the same way, extrapolating the previous route BR of the electric vehicle 2 into a corresponding forward movement, here represented as a dashed drop-shaped area TG2. A common meeting point in area TG2 disturbs the route of the electric vehicle 2 significantly less than a meeting point in area TG1 based only on the current position P2 of the electric vehicle 2 at the time of transmission of the charging request. For this purpose the software application 4 transmits the previous route BR based on correspondingly recorded position data with the charging request to the mobile charging vehicle 5. If the software application 4 transmits in addition to the previous route BR also the route GR planned for the electric vehicle 2 up to a route destination RZ to the charging vehicle 5, the navigation apparatus 51 of the charging vehicle 5 can take into account the planned route GR for the calculation of the common meeting point TP and the meeting time TZ as shown in FIG. 6. Here the common meeting point TP is exactly on the planned route GP of the electric vehicle 2 to the route destination RZ. Therefore, the planned charging of the battery 21 of the electric vehicle 2 does not interfere with the route BR,GR of the electric vehicle 2 at all, since the common meeting point TP and the driving distance FRE of the electric vehicle 2 to the meeting point TP corresponds to the planned route GR and therefore no detours and additional driving times have to be accepted. The navigation apparatus 51 of charging vehicle 5 can automatically calculate the fastest route for charging vehicle 5 to the meeting point TP and display it as driving route FRL in charging vehicle 5.

Figure 4:
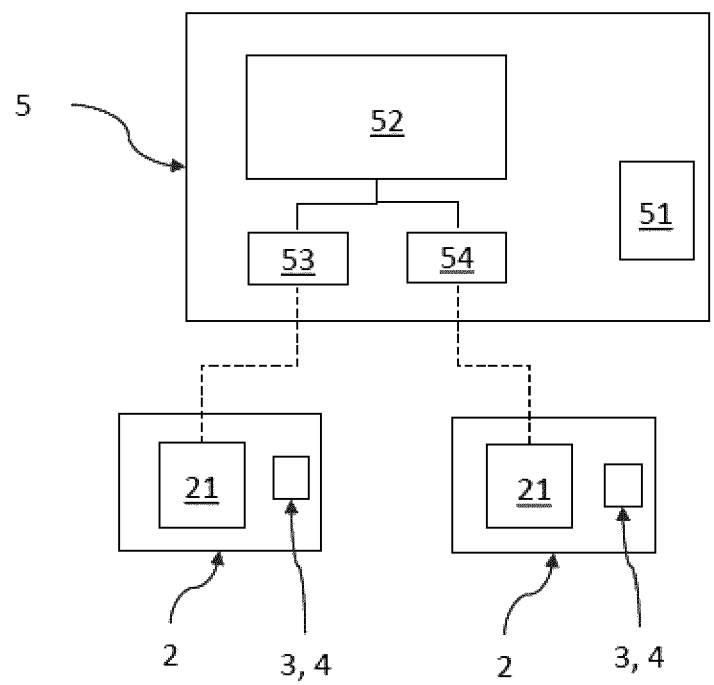
FIG. 4: Schematic representation of the charging vehicle of the dynamic charging system.

FIG. 4 shows a schematic representation of the charging vehicle 5 according to the invention, which in this case has a battery storage 52 of more than 300 kWh and a DC charging unit 53 and an AC charging unit 54 in addition to the navigation apparatus 51. Other charging vehicles may also have more DC and/or AC charging units 53, 54. The multiple charging units 53, 54 enable simultaneous charging of several 2 electric vehicles 2 each with battery 21 and mobile devices 3, on which the software applications 4 are installed and executed.

Figure 5:
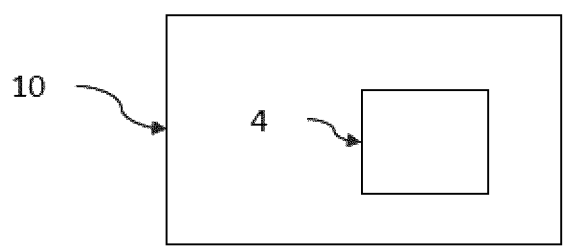
FIG. 5: Schematic representation of the data storage product with software application stored thereon for carrying out the dynamic charging system.

FIG. 5 shows a schematic representation of the data storage product 10 according to the invention with software application 4 stored thereon, which is suitable for the execution of the steps of method 100 according to FIG. 9, which are related to software application 4. Data storage products 10 can be any memory suitable for storing software programs such as software applications, for example data sticks, CDs, hard disks, servers and other devices suitable for this purpose.

FIG. 6 displays a schematic representation of an embodiment of the method according to the invention 100 for dynamic charging of electric vehicles in a charging system according to the invention comprising a software application 4 installed and executed at least on a mobile device 3, which comprises a navigation function or can be connected to a navigation device 22 respectively, and a plurality of mobile charging vehicles 5 each with a navigation apparatus 51. In this embodiment, the method comprises the steps of transmitting 110 of current positions P5 of each mobile charging vehicle 5 of the charging system 1 to the software application 4 by the navigation apparatus 51 of the charging vehicle 5; of displaying 120 at least the next mobile charging vehicle 5 on the mobile device 3 located in an electric vehicle 2 by the software application; transmitting 130 by the software application a charging request for the electric vehicle 2 and at least one current position P2 of the electric vehicle 2 to the indicated mobile charging vehicle 5 in the case of an electric battery 21 of the electric vehicle 2 to be charged; transmitting 140 coordinates of a suitable common meeting point TP and a suitable meeting time TZ for charging the battery 21 of the electric vehicle 2 on the basis of the received charging request to the mobile device 3 in the electric vehicle 2 to be charged in the electric vehicle 2 by the navigation apparatus 51 of the charging vehicle 5; and converting 150 of meeting point TP and meeting time TZ into navigation instructions for a driver of the electric vehicle to be charged 2 by the software application 4 for navigating the electric vehicle 2 to the common meeting point TP. In an embodiment (dotted arrow), the method comprises the additional step of at least periodically transmitting 170 the current position P5 of the charging vehicle 5 on a way to the common meeting point by the navigation apparatus 51 to the software application 4 for a retrieval the electric vehicle 2 and displaying 180 the current position P5 of the charging vehicle 5 on the way to the common meeting point TP by the software application 4 on a navigation display in the electric vehicle 2. Subsequent to step 130, the method may comprise the additional step of determining 160 the common meeting point TP and the meeting time TZ taking into account at least one previous route BR of the electric vehicle to be charged 2 from the navigation apparatus 51 of the mobile charging vehicle 5, wherein the software application 4 transmitted the previous route BR to the mobile charging vehicle 5 together with the charging request on the basis of correspondingly recorded position data. Furthermore, in addition to the previous route BR, the software application 4 can also transmit the route GR planned for the electric vehicle 2 up to a route destination RZ to the charging vehicle 5, and the navigation apparatus 51 of the charging vehicle 5 can take into account the planned route GR for calculating 160 of the common meeting point TP and the meeting time TZ.

The embodiments shown here are only examples of the present invention and must therefore not be understood in a restrictive way. Alternative embodiments considered by the skilled person are equally covered by the scope of protection of the present invention.

REFERENCE SIGNS 1 charging system for dynamically charging electric vehicles
2 electric vehicle (to be charged)
21 battery of the electric vehicle
22 navigation device in electric vehicle
3 mobile device
4 software application
5 mobile charging vehicle
51 navigation apparatus of the charging vehicle
52 battery storage of the charging vehicle
53 DC charging unit of the charging vehicle
54 AC charging unit of the charging vehicle
10 data storage product
100 method for dynamic charging of electric vehicles
110 transmitting the current position of charging vehicles to the software application
120 displaying at least the next charging vehicle on the mobile device
130 transmitting a charging request for the electric vehicle to the charging vehicle
140 transmitting coordinates of the common meeting point and the meeting time to the mobile device 150 converting meeting point and meeting time into navigation instructions for a driver of the electric vehicle to be charged 160 determining the common meeting point and the meeting time taking into account at least one previous route of the electric vehicle to be charged 170 at least periodically transmitting to the software application the current position of the charging vehicle on its way to the common meeting point 180 displaying of the current Position of the charging vehicle on the way to the common meeting point by the software application in the electric vehicle 190 selecting one of the displayed charging vehicles as the charging vehicle for charging the vehicle battery BR previous route of the electric vehicle to be charged FRL driving route of the charging vehicle to the common meeting point FRE driving route of the electric vehicle to the common meeting point GP planned route of the electric vehicle P2 current position of the electric vehicle P5 current position of the charging vehicle RZ route destination of the electric vehicle TG1 potential meeting point area with consideration of the current position of the electric vehicle TG2 potential meeting point area with consideration of the previous route of the electric vehicle TP meeting point for charging vehicle and electric vehicle to be charged TZ meeting time for the meeting of charging vehicle and electric vehicle to be charged

The invention claimed is:

1. A charging system for dynamic charging of electric vehicles, comprising at least one navigation function on at least one mobile device or connectable to a navigation device, and/or software application installed and executed on at least one server, and a plurality of mobile charging vehicles each having a navigation apparatus configured to, inter alia, transmit a current position of each mobile charging vehicle of the charging system to the software application, wherein the software application is configured to display at least the respective next mobile charging vehicle on the mobile device located in an electric vehicle and, in the case that an electric battery of the electric vehicle is to be charged, to transmit a charging request for this electric vehicle and at least one current position of the electric vehicle to the displayed mobile charging vehicle, wherein the navigation apparatus of the charging vehicle is configured for transmitting coordinates of a suitable common meeting point and a suitable meeting time for charging the battery of the electric vehicle to the mobile device in the electric vehicle to be charged on the basis of the received charging request, wherein the software application is configured to convert the meeting point and meeting time into navigation instructions for a driver of the electric vehicle to be charged wherein the software application only generates the navigation instructions from the common meeting point and meeting time for the electric vehicle, after a confirmation of the charging request at the common meeting point was transmitted to the charging vehicle via the software application and/or an exchange of data between the server and the mobile device and/or a data storage and/or an exchange of data within the software application at least partially using a block chain system is carried out.

2. The charging system according to claim 1, characterized in that the common meeting point and the meeting time are determined by the navigation apparatus of the mobile charging vehicle taking into account at least one previous route of the electric vehicle to be charged, wherein the software application transmits the previous route to the mobile charging vehicle with the charging request on the basis of correspondingly recorded position data.

3. The charging system according to claim 2, characterized in that the software application transmits to the charging vehicle, in addition to the previous route, also the route planned for the electric vehicle up to a route destination, and the navigation apparatus of the charging vehicle takes into account the planned route to calculate the common meeting point and the meeting time.

4. The charging system according to claim 1, characterized in that the navigation apparatus of the charging vehicle automatically calculates the fastest route for the charging vehicle to the meeting point and displays it in the charging vehicle as a driving route.

5. The charging system according to claim 1, characterized in that the navigation apparatus of the charging vehicle transmits the current position of the charging vehicle at least periodically to the software application for a retrieval in the electric vehicle on a path to the common meeting point.

6. The charging system according to claim 5, characterized in that the software application is configured to display the current position of the charging vehicle on the way to the common meeting point on a navigation display in the electric vehicle.

7. The charging system according to claim 1, characterized in that the software application is configured to display all positions of all charging vehicles in order to enable a selection of a desired charging vehicle for charging the electric vehicle.

8. The charging system according to claim 1 characterized in that the software application is configured to propose to the charging vehicle a meeting point and/or a common meeting time, which is adopted by the charging vehicle as common meeting point and common meeting time.

9. The charging system according to claim 1, characterized in that the charging vehicle has an energy storage or battery storage of more than 300 kWh and at least one DC charging unit and at least one AC charging unit.

10. A method for dynamic charging of electric charging vehicles in a charging system according to one of the claim 1 comprising a software application installed and executed at least on a mobile device which comprises a navigation function or respectively connectable to a navigation device, and a plurality of mobile charging vehicles each having a navigation apparatus, comprising the following steps:

transmitting current positions of each mobile charging vehicle of the charging system to the software application by the navigation apparatus of the charging vehicle;

displaying at least the respective next mobile charging vehicle on the mobile device located in an electric vehicle by the software application;

transmitting by the software application a charging request for the electric vehicle and at least one current position of the electric vehicle to the displayed mobile charging vehicle in the case of an electric vehicle having an electric battery to be charged;

transmitting coordinates of a suitable common meeting point and a suitable meeting time for charging the battery of the electric vehicle based on the received charging request to the mobile device in the electric vehicle to be charged by the navigation apparatus of the charging vehicle;

conversion by the software application of meeting point and meeting time into navigation instructions for a driver of the electric vehicle to be charged by the software application for navigation of the electric vehicle to the common meeting point, and generating by the software application the navigation instructions from the common meeting point and meeting time for the electric vehicle, after a confirmation of the charging request at the common meeting point was transmitted to the charging vehicle via the software application and/or an exchange of data between the server and the mobile device and/or a data storage and/or an exchange of data within the software application at least partially using distributed ledger technology is carried out.

11. The method according to claim 10, comprising the additional step of determining the common meeting point and the meeting time taking into account at least one previous route of the electric vehicle to be charged from the navigation apparatus of the mobile charging vehicle, wherein the software application has transmitted the previous route to the mobile charging vehicle together with the charging request on the basis of correspondingly recorded position data.

12. The method according to claim 11, wherein the software application transmits, in addition to the previous route, also the route planned for the electric vehicle up to a route destination to the charging vehicle and the navigation apparatus of the charging vehicle takes into account the planned route for calculating the common meeting point and the meeting time.

13. The method according to claim 10, comprising the additional step of at least periodically transmitting the current position of the charging vehicle on a path to the common meeting point by the navigation apparatus to the software application for a retrieval in the electric vehicle.

14. The method according to claim 13, comprising the additional step of displaying the current position of the charging vehicle on its way to the common meeting point by the software application on a navigation display in the electric vehicle.

15. The method according to claim 10, wherein the software application displays all positions of all charging vehicles to enable selection of a desired charging vehicle for charging the electric vehicle, followed by selecting one of the displayed charging vehicles as the charging vehicle for charging the battery of the electric vehicle.

16. A data storage product having a software application stored on the data storage product, suitable for executing the steps of the method relating to the software application according to one of the claim 10.

17. A charging system for dynamic charging of electric vehicles, comprising at least one navigation function on at least one mobile device or connectable to a navigation device, and/or software application installed and executed on at least one server, and a plurality of mobile charging vehicles each having a navigation apparatus configured to, inter alia, transmit a current position of each mobile charging vehicle of the charging system to the software application, wherein the software application is configured to display at least the respective next mobile charging vehicle on the mobile device located in an electric vehicle and, in the case that an electric battery of the electric vehicle is to be charged, to transmit a charging request for this electric vehicle and at least one current position of the electric vehicle to the displayed mobile charging vehicle, wherein the navigation apparatus of the charging vehicle is configured for transmitting coordinates of a suitable common meeting point and a suitable meeting time for charging the battery of the electric vehicle to the mobile device in the electric vehicle to be charged on the basis of the received charging request, wherein the software application is configured to convert the meeting point and meeting time into navigation instructions for a driver of the electric vehicle to be charged, wherein the common meeting point and the meeting time are determined by the navigation apparatus of the mobile charging vehicle taking into account at least one previous route of the electric vehicle to be charged, wherein the software application transmits the previous route to the mobile charging vehicle with the charging request on the basis of correspondingly recorded position data.

18. The charging system of claim 1, wherein the charging vehicle is a truck.

* * * * *